US010737702B2

(12) United States Patent
McNew

(10) Patent No.: US 10,737,702 B2
(45) Date of Patent: Aug. 11, 2020

(54) VISUALLY SIMULATING DRIVING PLANS IN AUTONOMOUS VEHICLES

(71) Applicant: Toyota Motor Engineering & Manufacturing North America, Inc., Erlanger, KY (US)

(72) Inventor: John-Michael McNew, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 574 days.

(21) Appl. No.: 15/221,002

(22) Filed: Jul. 27, 2016

(65) Prior Publication Data
US 2018/0029610 A1    Feb. 1, 2018

(51) Int. Cl.
*G05D 1/02*       (2020.01)
*B60W 50/14*     (2020.01)
*B60W 50/00*     (2006.01)
*G05G 1/16*       (2006.01)
*B60W 30/08*     (2012.01)
*G08G 1/0962*   (2006.01)

(52) U.S. Cl.
CPC ............ *B60W 50/14* (2013.01); *B60W 30/08* (2013.01); *B60W 50/0097* (2013.01); *G08G 1/0962* (2013.01); *B60W 2050/146* (2013.01); *B60W 2540/215* (2020.02); *B60W 2554/00* (2020.02); *B60W 2556/00* (2020.02)

(58) Field of Classification Search
None
See application file for complete search history.

(56) References Cited

U.S. PATENT DOCUMENTS

| 8,738,213 | B1 | 5/2014 | Szybalski et al. |
| 8,818,608 | B2 | 8/2014 | Cullinane et al. |
| 9,501,058 | B1* | 11/2016 | Mariet ...................... B60T 7/22 |
| 2012/0173067 | A1 | 7/2012 | Szczerba et al. |
| 2012/0173069 | A1 | 7/2012 | Tsimhoni et al. |
| 2012/0188374 | A1* | 7/2012 | Taner .............. B60W 30/18163 348/148 |

(Continued)

FOREIGN PATENT DOCUMENTS

| JP | 2015-230552 A | 12/2015 |
| WO | 2015/141308 A1 | 9/2015 |

*Primary Examiner* — Kevin P Mahne
(74) *Attorney, Agent, or Firm* — Christopher G. Darrow; Darrow Mustafa PC

(57) ABSTRACT

A method of autonomous driving includes evaluating information about an environment surrounding a vehicle, identifying a driving maneuver, and generating a driving plan for performing the driving maneuver based on the evaluation of the information about the environment surrounding the vehicle. Additionally, to apprise a user of a risk of performing the driving maneuver, the method includes visually simulating the driving plan by displaying, on a display, a sequence of actions associated with performing the driving maneuver. Further, the method includes outputting, at at least one interface, a query whether the user confirms the driving maneuver. When, in response to the query, a user response is received, at the at least one interface, that the user confirms the driving maneuver, the method includes operating vehicle systems in the vehicle to perform the driving maneuver according to the driving plan.

18 Claims, 5 Drawing Sheets

(56) References Cited

U.S. PATENT DOCUMENTS

| | | | |
|---|---|---|---|
| 2014/0249722 A1* | 9/2014 | Hegemann | G08G 1/16 701/41 |
| 2014/0253310 A1* | 9/2014 | Tippelhofer | B60K 35/00 340/439 |
| 2015/0149088 A1* | 5/2015 | Attard | G01C 21/36 701/538 |
| 2015/0166058 A1* | 6/2015 | Mizutani | B60W 50/14 701/1 |
| 2015/0248131 A1* | 9/2015 | Fairfield | G05D 1/0044 701/2 |
| 2017/0151958 A1* | 6/2017 | Sakuma | B60W 50/10 |
| 2017/0297588 A1* | 10/2017 | Doshi | B60W 50/10 |
| 2017/0320500 A1* | 11/2017 | Yoo | B60W 30/0956 |

\* cited by examiner

VISUALLY SIMULATING DRIVING PLANS IN AUTONOMOUS VEHICLES

TECHNICAL FIELD

The embodiments disclosed herein generally relate to autonomous operation systems for vehicles, and more particularly to their generation and execution of driving plans for maneuvering vehicles on roadways.

BACKGROUND

Some vehicles include an autonomous operation system under which the vehicle is subject to autonomous operation. In these so-called autonomous vehicles, a human driver may cede control over one or more primary control functions in favor of autonomous operation. In autonomous operation, the autonomous operation system generates a driving plan for maneuvering the vehicle on a roadway based on detected information about the environment surrounding the vehicle. To execute the driving plan, the autonomous operation system operates vehicle systems associated with the primary control functions over which the human driver has ceded control.

SUMMARY

Disclosed herein are embodiments of methods of autonomous driving and vehicles with components of autonomous operation systems. These embodiments involve visually simulating driving plans for performing driving maneuvers prior to the driving maneuvers being performed.

In one aspect, a method of autonomous driving includes facets of perception, planning/decision making and control. A perception module is used to evaluate information about an environment surrounding a vehicle. A planning/decision making module is used to identify a driving maneuver, and generate a driving plan for performing the driving maneuver based on the evaluation of the information about the environment surrounding the vehicle. Additionally, to apprise a user of a risk of performing the driving maneuver, the planning/decision making module is used to visually simulate the driving plan by displaying, on a display, a sequence of actions associated with performing the driving maneuver. Further, the planning/decision making module is used to output, at at least one interface, a query whether the user confirms the driving maneuver. When, in response to the query, a user response is received, at the at least one interface, that the user confirms the driving maneuver, a control module is used to operate vehicle systems in the vehicle to perform the driving maneuver according to the driving plan.

In another aspect, a vehicle includes sensors configured to detect information about an environment surrounding the vehicle, a display, at least one interface and vehicle systems operable to maneuver the vehicle. The vehicle further includes one or more modules stored on memory and executable by at least one processor for initiating instructions. According to the instructions, the modules are used to evaluate information about the environment surrounding the vehicle detected by the sensors, to identify a driving maneuver, and to generate a driving plan for performing the driving maneuver based on the evaluation of the information about the environment surrounding the vehicle. Additionally, to apprise a user of a risk of performing the driving maneuver, the modules are used to visually simulate the driving plan by displaying, on the display, a sequence of actions associated with performing the driving maneuver. Further, the modules are used to output, at the at least one interface, a query whether the user confirms the driving maneuver. When, in response to the query, a user response is received, at the at least one interface, that the user confirms the driving maneuver, the modules are used to operate the vehicle systems to perform the driving maneuver according to the driving plan.

In yet another aspect, a method of autonomous driving includes facets of perception, planning/decision making and control. A perception module is used to evaluate information about an environment surrounding a vehicle. A planning/decision making module is used to identify a driving maneuver, and generate a driving plan for performing the driving maneuver based on the evaluation of the information about the environment surrounding the vehicle. The planning/decision making module is also used to categorize the driving maneuver, based on a risk of its performance, as infeasible, or as feasible, but with some risk, reject the driving maneuver when the driving maneuver is categorized as infeasible, and provisionally accept the driving maneuver when the driving maneuver is categorized as feasible, but with some risk. Additionally, when the driving maneuver is provisionally accepted, to apprise a user of a risk of performing the driving maneuver, the planning/decision making module is used to visually simulate the driving plan by displaying, on a display, a sequence of actions associated with performing the driving maneuver. Further, the planning/decision making module is used to output, at at least one interface, a query whether the user confirms the driving maneuver, and non-provisionally accept the driving maneuver when, in response to the query, a user response is received, at the at least one interface, that the user confirms the driving maneuver. When the driving maneuver is non-provisionally accepted, a control module is used to operate vehicle systems in the vehicle to perform the driving maneuver according to the driving plan.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle with an autonomous operation system configured to generate, visually simulate and execute driving plans for maneuvering the vehicle on roadways. The driving plans are, more specifically, for performing driving maneuvers. The driving maneuvers are initially identified as candidates either by the vehicle itself or from user requests for the vehicle to perform the driving maneuvers. In certain risk scenarios, the driving maneuvers are provisionally accepted by the vehicle, subject to a user being apprised of the risk of their performance and, notwithstanding the risk, confirming the driving maneuvers. The user confirming the driving maneuvers is a condition to their acceptance and ultimate performance by the vehicle. The appraisal is accomplished by visually simulating the driving plans for performing the driving maneuvers.

Figure 1:
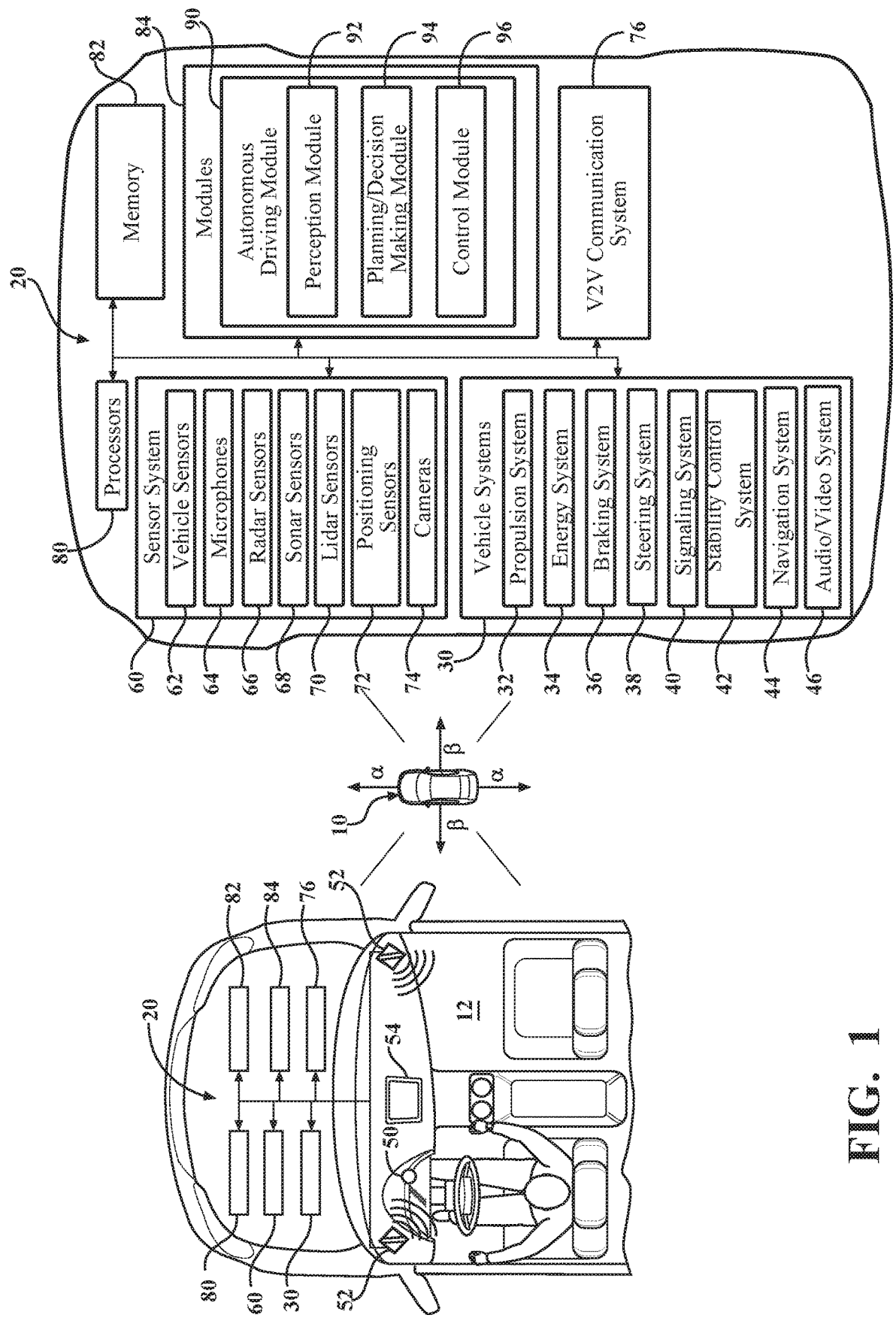
FIG. 1 includes top views of a vehicle, showing, via block diagrams, components of an autonomous operation system.

A representative vehicle 10 is shown in FIG. 1. The vehicle 10 has an exterior and a number of inner compartments. The inner compartments may include a passenger compartment 12, an engine compartment and, for the illustrated vehicle 10, a trunk.

The vehicle 10 may include, among other things, an engine, motor, transmission and other powertrain components housed in its engine compartment or elsewhere in the vehicle 10, as well as other powertrain components, such as wheels. The wheels support the remainder of the vehicle 10. One, some or all of the wheels may be powered by other powertrain components to drive the vehicle 10. One, some or all of the wheels may be steered wheels subject to having their steering angles adjusted to adjust the orientation of the vehicle 10.

The vehicle 10 includes an autonomous operation system 20 under which the vehicle 10 is, generally speaking, subject to autonomous operation. Under the autonomous operation system 20, the vehicle 10 may be semi-autonomous or highly automated, for instance.

The autonomous operation system 20 includes various autonomous support systems that support autonomous operation of the vehicle 10. Although the autonomous support systems could be dedicated to the autonomous operation system 20, it is contemplated that some or all of the autonomous support systems may also support other functions of the vehicle 10, including its manual operation.

The autonomous support systems may be or include various vehicle systems 30. The vehicle systems 30 may include a propulsion system 32, an energy system 34, a braking system 36, a steering system 38, a signaling system 40, a stability control system 42, a navigation system 44 and an audio/video system 46, for example, as well as any other systems generally available in vehicles.

The propulsion system 32 includes components operable to accelerate the vehicle 10, as well as maintain its speed. The propulsion system 32 may include, for instance, the engine, motor, transmission and other powertrain components, as well as certain vehicle controls, such as a cruise control system. The energy system 34 includes components that control or otherwise support the storage and use of energy by the vehicle 10. The energy source employed by the energy system 34 may include, for instance, gasoline, natural gas, diesel oil and the like, as well as batteries, fuel cells and the like.

The braking system 36 includes components operable to decelerate the vehicle 10, such as brakes, for instance. The steering system 38 includes components operable to adjust the orientation of the vehicle 10 with respect to its longitudinal direction α or lateral direction β, or both, by, for example, adjusting the steering angle of one, some or all of the wheels. The signaling system 40 includes components operable to communicate driving intentions and other notifications to other vehicles and their users. The signaling system 40 may include, for instance, exterior lights such as headlights, a left-turn indicator light, a right-turn indicator light, a brake indicator light, a backup indicator light, taillights and a running light. The stability control system 42 includes components operable to maintain, among other aspects of the stability of the vehicle 10, its proper yaw and pitch, by, for example, actuating brakes and adjusting the power to one, some or all of the wheels powered by other powertrain components to drive the vehicle 10.

The navigation system 44 establishes routes and directions for the vehicle 10 using, for instance, digital maps. The navigation system 44 may itself include digital maps, or the navigation system 44 may connect to remote sources for digital maps. In the absence of the navigation system 44, the autonomous operation system 20 may connect to remote sources for routes and directions for the vehicle 10.

The audio/video system 46 includes components operable to serve as an interface between users of the vehicle 10 and the vehicle 10 itself. The audio/video system 46 may include components operable to detect mechanical and verbal inputs received from a user of the vehicle 10 and transform those inputs into corresponding input signals. The audio/video system 46 may also include components operable to transform signals, such as signals representing media, into tactile, visual and sound outputs that may be sensed by a user of the vehicle 10. The audio/video system 46 may include, for instance, one or more microphones 50, one or more speakers 52 and one or more displays 54.

The microphones 50 are operable detect, among other sounds waves, verbal inputs from users of the vehicle 10, and transform those verbal inputs into corresponding input signals. The speakers 52 are operable to receive, among other signals, signals representing media from the remainder of the audio/video system 46 and the vehicle 10, and transform those signals into sound outputs that may be heard by users of the vehicle 10. The microphones 50 may be located within the passenger compartment 12 of the vehicle 10 at any location suitable for detecting verbal inputs from a user of the vehicle 10. Similarly, the speakers 52 may be located within the passenger compartment 12 of the vehicle 10 at any location suitable for its sound outputs to be heard by a user of the vehicle 10.

The displays 54 are operable to receive, among other signals, signals representing media from the remainder of the audio/video system 46 and the vehicle 10, and employ any of various display technologies to transform those signals into visual outputs at their surfaces that may be seen by users of the vehicle 10. The displays 54 may also include touch screens by which the displays 54 are operable to detect the presence and location of mechanical inputs from users of the vehicle 10 at their surfaces, and transform those mechanical inputs into corresponding input signals. The displays 54 may be configured, for example, to receive these mechanical inputs via their touch screens directly upon the visual outputs at their surfaces. The displays 54, similarly to the microphones 50 and the speakers 52, may be located within the passenger compartment 12 of the vehicle 10 at any location suitable for their visual outputs to be seen by users of the vehicle 10, and for receiving mechanical inputs from users of the vehicle 10 via their touch screens.

In addition to the vehicle systems 30, the autonomous support systems may be or include a sensor system 60 including one or more sensors. The sensor system 60 and its sensors may be positioned anywhere in or on the vehicle 10, and may include existing sensors of the vehicle 10, such as backup sensors, lane keeping sensors and front sensors, for instance. In these and other configurations, the sensor system 60 and its sensors may detect information about the vehicle 10, including without limitation information about the operation of the vehicle 10, information about its passenger compartment 12 and information about the environment surrounding the vehicle 10. In the case of information about the environment surrounding the vehicle 10, the sensor system 60 and its sensors may detect information about the environment in front of and behind the vehicle 10 in its longitudinal direction α, as well as to the sides of the vehicle 10 in its lateral direction β.

The sensor system 60 and its sensors may be configured to monitor in real-time, that is, at a level of processing responsiveness at which sensing is sufficiently immediate for a particular process or determination to be made, or that enables a processor to keep up with some external process.

The sensors of the sensor system 60 may include one or more vehicle sensors 62, one or more microphones 64, one or more radar sensors 66, one or more sonar sensors 68, one or more lidar sensors 70, one or more positioning sensors 72 and one or more cameras 74, for example, as well as any other sensors generally available in vehicles.

The vehicle sensors 62 are operable to detect information about the operation of the vehicle 10. The vehicle sensors 62 may include, for instance, speedometers, gyroscopes, magnetometers, accelerometers, barometers, thermometers, altimeters, inertial measurement units (IMUs) and controller area network (CAN) sensors. In these and other configurations of the vehicle sensors 62, the detected information about the operation of the vehicle 10 may include, for example, its speed, acceleration, orientation, rotation, direction, elevation, temperature and the like, as well as the operational statuses of the vehicle systems 30 and their components.

The microphones 64 are operable detect sounds waves, and transform those sound waves into corresponding signals. Some microphones 64 may be located to detect sound waves within the passenger compartment 12 of the vehicle 10. These microphones 64 may be the same as, or auxiliary to, the microphones 50 of the audio/video system 46, and may be similarly located within the passenger compartment 12 of the vehicle 10. Other microphones 64 may be located to detect sound waves in the environment surrounding the vehicle 10. These microphones 64 may, accordingly, be at least partially exposed to the environment surrounding the vehicle 10.

The radar sensors 66, the sonar sensors 68 and the lidar sensors 70 are each mounted on the vehicle 10 and positioned to have a fields of view in the environment surrounding the vehicle 10, and are each, generally speaking, operable to detect objects in the environment surrounding the vehicle 10. More specifically, the radar sensors 66, the sonar sensors 68 and the lidar sensors 70 are each operable to scan the environment surrounding the vehicle 10, using radio signals in the case of the radar sensors 66, sound waves in the case of the sonar sensors 68 and laser signals in the case of the lidar sensors 70, and generate signals representing objects, or the lack thereof, in the environment surrounding the vehicle 10. Among other things about the objects, the signals may represent their presence, location and motion, including their speed, acceleration, orientation, rotation, direction and the like, either absolutely or relative to the vehicle 10, or both.

The positioning sensors 72 are operable to identify the position of the vehicle 10. The positioning sensors 72 may implement, in whole or in part, a GPS, a geolocation system or a local positioning system, for instance, or any combination of these. For implementing a GPS, the positioning sensors 72 may include GPS transceivers configured to determine a position of the vehicle 10 with respect to the Earth via its latitude and longitude and, optionally, its altitude.

The cameras 74 are operable to detect light or other electromagnetic energy from objects, and transform that electromagnetic energy into corresponding visual data signals representing objects, or the lack thereof. The cameras 74 may be, or include, one or more image sensors configured for capturing light or other electromagnetic energy. These image sensors may be, or include, one or more photodetectors, solid state photodetectors, photodiodes or photomultipliers, or any combination of these. In these and other configurations, the cameras 74 may be any suitable type, including without limitation high resolution, high dynamic range (HDR), infrared (IR) or thermal imaging, or any combination of these.

Some cameras 74 may be located to detect electromagnetic energy within the passenger compartment 12 of the vehicle 10. These cameras 74 may accordingly be located within the passenger compartment 12 of the vehicle 10. Other cameras 74 may be located to detect electromagnetic energy in the environment surrounding the vehicle 10. These cameras 74 may be mounted on the vehicle 10 and positioned to have fields of view individually, or collectively, common to those of the radar sensors 66, the sonar sensors 68 and the lidar sensors 70 in the environment surrounding the vehicle 10, for example.

In addition to the vehicle systems 30 and the sensor system 60, the autonomous support systems may be or include a vehicle-to-vehicle (V2V) communication system 76. The V2V communication system 76 is operable to establish wireless communication with other vehicles. The V2V communication system 76 wirelessly receives information about other vehicles, including information about their presence, location and motion, for instance, as well as their state. Similarly, the V2V communication system 76 wirelessly transmits the same or similar information about the vehicle 10 to other vehicles. The V2V communication system 76 may implement dedicated short range communication (DSRC), for instance, or other kinds of wireless communication.

In addition to its autonomous support systems, the autonomous operation system 20 includes one or more processors 80, a memory 82 and one or more modules 84. Together, the processors 80, the memory 82 and the modules 84 constitute a computing device to which the vehicle systems 30, the sensor system 60 and any other autonomous support systems are communicatively connected. Although this computing device could be dedicated to the autonomous operation system 20, it is contemplated that some or all of its processors 80, its memory 82 and its modules 84 could also be configured as parts of a central control system for the vehicle 10, for instance, such as a central electronic control unit (ECU).

The processors 80 may be any components configured to execute any of the processes described herein or any form of instructions to carry out such processes or cause such processes to be performed. The processors 80 may be implemented with one or more general-purpose or special-purpose processors. Examples of suitable processors 80 include microprocessors, microcontrollers, digital signal processors or other forms of circuitry that can execute software. Other examples of suitable processors 80 include without limitation central processing units (CPUs), array processors, vector processors, digital signal processors (DSPs), field-programmable gate arrays (FPGAs), programmable logic arrays (PLAs), application specific integrated circuits (ASICs), programmable logic circuitry or controllers. The processors 80 can include at least one hardware circuit (e.g., an integrated circuit) configured to carry out instructions contained in program code. In arrangements where there are multiple processors 80, the processors 80 can work independently from each other or in combination with one another.

The memory 82 is a non-transitory computer readable medium. The memory 82 may include volatile or non-volatile memory, or both. Examples of suitable memory 82 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives or any other suitable storage medium, or any combination of these. The memory 82 includes stored instructions in program code. Such instructions can be executed by the processors 80 or the modules 84. The memory 82 may be part of the processors 80 or the modules 84, or may be communicatively connected the processors 80 or the modules 84.

The modules 84 are employable to perform various tasks in the vehicle 10. Generally speaking, the modules 84 include instructions that may be executed by the processors 80. The modules 84 can be implemented as computer readable program code that, when executed by the processors 80, execute one or more of the processes described herein. Such computer readable program code can be stored on the memory 82. The modules 84 may be part of the processors 80, or may be communicatively connected the processors 80.

The modules 84 may include, for example, an autonomous driving module 90. The autonomous driving module 90 generates driving plans for maneuvering the vehicle 10 on roadways based on the information about the vehicle 10, including information detected by the sensor system 60 and its sensors, visually simulates the driving plans, in certain risk scenarios, and executes the driving plans by operating the appropriate vehicle systems 30. In this so-called autonomous operation of the vehicle 10, its human driver will have ceded control over one or more primary control functions in favor of autonomous operation. These primary control functions may include propulsion, or throttle, braking or steering, for instance, or any combination of these. The vehicle systems 30 operated by the autonomous driving module 90 include those associated with the primary control functions over which the human driver has ceded control.

Among other sub-modules, the autonomous driving module 90 may include a perception module 92, a planning/decision making module 94 and a control module 96.

The perception module 92 gathers and evaluates information about the vehicle 10, including information detected by the sensor system 60 and its sensors and information about other vehicles communicated from the V2V communication system 76, as well as information sourced from digital maps. In the case of information about the environment surrounding the vehicle 10 detected by the sensor system 60 and its sensors, the perception module 92 may, as part of its evaluation, identify objects in the environment surrounding the vehicle 10, including their properties. These properties may include, among other things about the objects, their presence, location and motion, including their speed, acceleration, orientation, rotation, direction and the like, either absolutely or relative to the vehicle 10, or both. In cases where these objects are other vehicles, the perception module 92 may additionally, or alternatively, identify these things, as well as the states of the other vehicles, from the information about the other vehicles communicated from the V2V communication system 76.

The perception module 92 may discriminate between different objects and individually track different objects over time. Either on initial detection or after tracking them over time, the perception module 92 may classify the objects to account not only for roadways, features of roadways, such as lane markings, and obstacles on roadways, such as other vehicles, but also for surrounding ground, pedestrians, bicycles, construction equipment, road signs, buildings, trees and foliage, for instance.

Either alone or in combination with its identification and classification of objects in the environment surrounding the vehicle 10, the perception module 92 may identify the location of the vehicle 10 in the environment surrounding the vehicle 10. For example, the perception module 92 may implement localization techniques that match identified objects in the environment surrounding the vehicle 10, as well as their properties, to those reflected in digital maps as part of an overall 3D road network. The autonomous driving module 90 may itself include digital maps, for instance, or the perception module 92 may connect to the navigation system 44 or to remote sources for digital maps. Implementing these or other localization techniques, the perception module 92 may identify, among other aspects about the location of the vehicle 10 in the environment surrounding the vehicle 10, the location of the vehicle 10 on roadways.

The planning/decision making module 94, based on the evaluation of the information about the vehicle 10 by the perception module 92, generates driving plans for maneuvering the vehicle 10 on roadways. The driving plans may be, more specifically, for performing driving maneuvers. The driving plans may be part of, or augment, larger but otherwise analogous and similarly generated driving plans for maneuvering the vehicle 10 on roadways.

The driving plans may account for any objects in the environment surrounding the vehicle 10, as well as their properties, for example. In the case of obstacles on roadways, the driving plans may account for their predicted future maneuvering along the roadways. Accordingly, as part of its generation of driving plans, the planning/decision making module 94 may predict the future maneuvering of obstacles along roadways. The predicted future maneuvering of an obstacle along a roadway may be based on its presence, location and motion, as identified by the perception module 92, as well as how the perception module 92 classifies the obstacle and tracks it over time.

The driving plans themselves, as well as underlying predictions of the future maneuvering of obstacles along roadways, may also account for different lane positions and traffic rules, such as speed limits, priorities at intersections and roundabouts, stop line positions and the like. The autonomous driving module 90 may itself include digital maps reflecting these lane positions and traffic rules as part of an overall 3D road network, for instance, or the planning/decision making module 94 may connect to the navigation system 44 or to remote sources for digital maps.

Either alone or in combination with its generation of driving plans, the planning/decision making module 94 identifies problems with performing their driving maneuvers. The planning/decision making module 94 also determines the overall risk of performing driving maneuvers as the product the problems with their performance. In certain risk scenarios, the planning/decision making module 94 apprises a user of the risk of performing driving maneuvers by visually simulating the driving plans.

The control module 96 operates the appropriate vehicle systems 30 to execute the driving plans generated by the planning/decision making module 94. The control module 96 may send control signals to the vehicle systems 30 or may directly send control signals to actuators that operate their components, or both.

Figure 2:
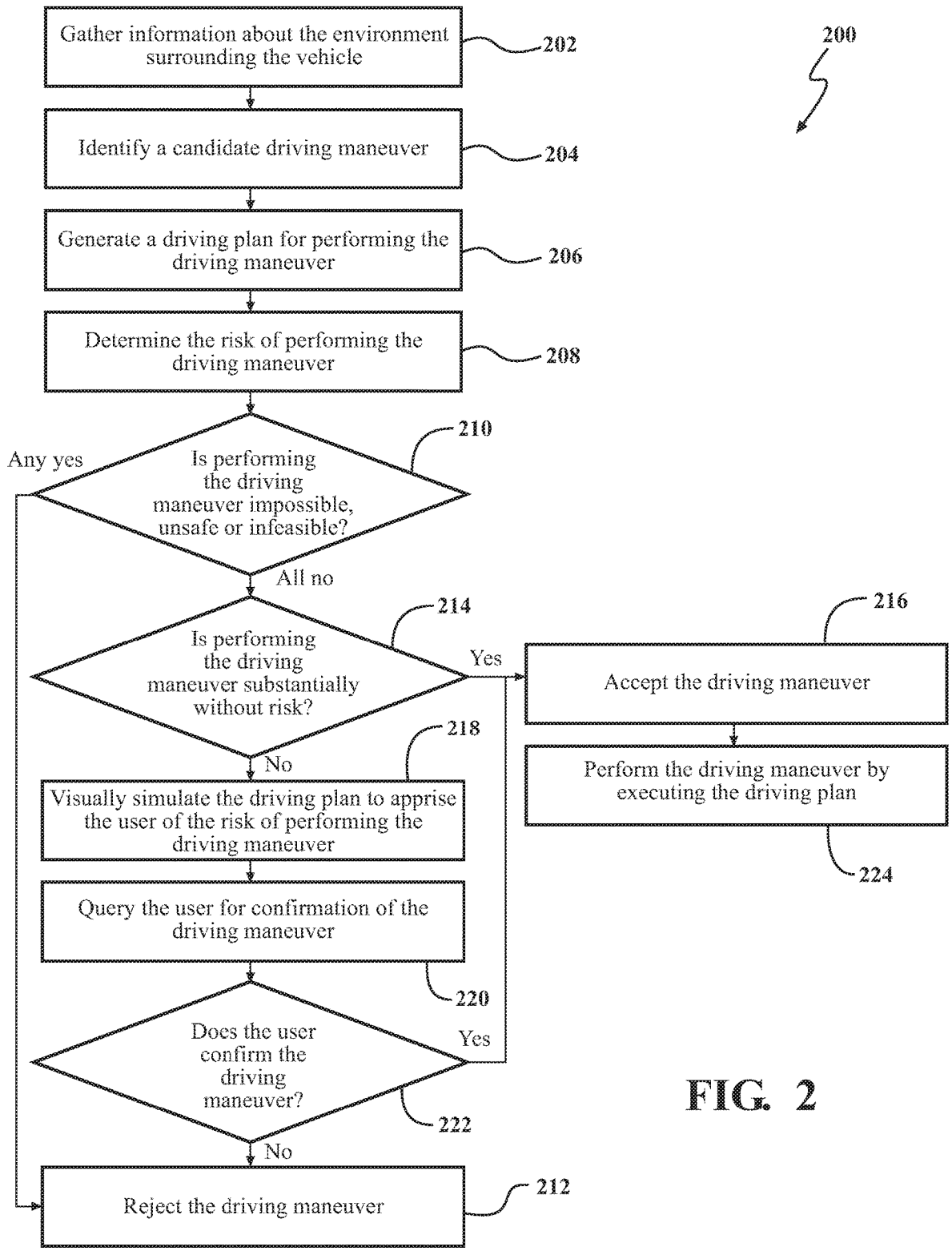
FIG. 2 is a flowchart showing the operations of a process by which the autonomous operation system generates, visually simulates and executes driving plans for performing vehicle maneuvers.

The operations of a process 200 by which the autonomous operation system 20 generates, visually simulates and executes driving plans for performing driving maneuvers are shown in FIG. 2.

In operation 202, information about the vehicle 10 is detected by the sensor system 60 and its sensors, or is otherwise received, for example from digital maps, for gathering and evaluation by the perception module 92.

In the case of information about the environment surrounding the vehicle 10, the perception module 92 may, as part of its evaluation, identify, among other objects in the environment surrounding the vehicle 10, roadways, as well as any obstacles on the roadways, such as other vehicles.

In addition to identifying roadways themselves, the perception module 92 may identify their features, such as lane markings, as well as different lane positions. In addition to identifying obstacles themselves, the perception module 92 may identify their properties, such as their presence, location and motion.

In operation 204, driving maneuvers are identified as candidates. Driving maneuvers may be, or include, slowing down, speeding up, lane changes or takeovers, for instance, or any combination of these.

Driving maneuvers are identified as candidates either by the vehicle 10 on its own or from received user requests for the vehicle 10 to perform driving maneuvers, or both. Either way, according to the remainder of the process 200, there are cases where it is determined that the overall risk of performing a driving maneuver renders its performance feasible, but with some risk. In these cases, prior to the driving maneuver being accepted and, ultimately, performed, the user is apprised of the risk. The user must, notwithstanding the risk, confirm the driving maneuver as a condition to its acceptance. If a driving maneuver is identified by the vehicle 10, the user is apprised of the risk of its performance as part of an offer made by the vehicle 10, to the user, to perform the driving maneuver.

If, at the time a driving maneuver is identified as a candidate, the vehicle 10 is not in autonomous operation, the identification may prompt an offer for initial autonomous operation, in cases of identification by the vehicle 10, or is taken as a user request for initial autonomous operation, in cases of identification from a user request. On the other hand, if the vehicle 10 in the midst of autonomous operation at the time a driving maneuver is identified as a candidate, the identification may prompt an offer to deviate from an existing larger driving plan currently being executed, in cases of identification by the vehicle 10, or is taken as a user request to deviate from an existing larger driving plan currently being executed, in cases of identification from a user request.

In cases of identification by the vehicle 10, driving maneuvers are identified as candidates by the planning/decision making module 94. These driving maneuvers may be identified based on the evaluation of the information about the vehicle 10 by the perception module 92, for example.

In cases of identification from user requests, driving maneuvers are identified as candidates from inputs received from the user at the various interfaces implemented by the components of the audio/video system 46. The planning/decision making module 94 may, for instance, identify user requests for the vehicle 10 to perform driving maneuvers from input signals transformed from corresponding verbal inputs detected by the microphones 50. Similarly, the planning/decision making module 94, for instance, identify user requests for the vehicle 10 to perform driving maneuvers from input signals transformed from corresponding mechanical inputs detected by touch screens in the displays 54.

In operation 206, the planning/decision making module 94, based on the evaluation of the information about the vehicle 10 by the perception module 92, generates driving plans for performing the driving maneuvers identified in operation 204.

The driving plans describe various things about performing their driving maneuvers. Among other things, the driving plans describe the motion of the vehicle 10 along roadways. Part of a driving plan may describe a trajectory, or driving path, of the vehicle 10 along a roadway, for instance. Other parts the driving plan may describe the speed, acceleration and orientation of the vehicle 10 along the roadway, for instance. The driving plans also describe a number of actions associated with performing their driving maneuvers. Part of a driving plan may describe the acceleration, braking, steering and signaling associated with performing its driving maneuver, for instance.

The driving plans are generated based on the information about the environment surrounding the vehicle 10. The driving plans account for any objects in the environment surrounding the vehicle 10, as well as their properties. In the case of obstacles on roadways, the driving plans may account for their predicted future maneuvering along the roadways. The predicted future maneuvering of an obstacle along a roadway may describe, similarly to a driving plan, the motion of the obstacle along the roadway, including the driving path of the obstacle along the roadway, as well as the speed, acceleration and orientation of the obstacle along the roadway. The driving plans also account for different lane positions and traffic rules.

In operation 208, the planning/decision making module 94 determines the overall risk of performing the driving maneuvers for which the driving plans are generated. Any number of problems with performing the driving maneuvers may contribute to the risk of their performance. The problems may include safety, comfort or navigational problems, for example.

The planning/decision making module 94 may identify the problems with performing the driving maneuvers either alone or in combination with its generation of the driving plans. The problems are identified based on the driving plans and, more specifically, based on the actions associated with performing their driving maneuvers. The problems may be identified further based on the relationship between the driving plans, including the actions associated with performing the driving maneuvers, on the one hand, and information about the environment surrounding the vehicle 10, including objects in the environment surrounding the vehicle 10, as well as traffic rules, on the other hand.

The problems are identified bearing in mind the goal of performing the driving maneuvers to completion. Although some problems may be generally evident, other problems may be prospective. Accordingly, descriptions, in connection with the problems, that performing a driving maneuver "involves" something should be understood as describing that performing the driving maneuver evidently or prospectively involves that thing. Many if not all aspects of prospective problems are the product of uncertainties about the future of the environment surrounding the vehicle 10, including uncertainties in the predicted future maneuvering of obstacles along roadways.

A safety problem could be, for instance, that performing a driving maneuver involves unsafe actions, such as unsafely aggressive acceleration, braking or steering, for instance, or any combination of these. Another safety problem could be, for instance, that performing a driving maneuver involves unsafe proximity to obstacles on a roadway. Another safety problem could be, for instance, that performing a driving maneuver involves unsafely quick approach to obstacles on a roadway. A related safety problem could be, for instance, having to abandon a driving maneuver to avoid one or more other safety problems.

A comfort problem could be, for instance, that performing a driving maneuver involves uncomfortable (albeit safe) actions, such as uncomfortably aggressive acceleration, braking or steering, for instance, or any combination of these. Another comfort problem could be, for instance, that performing a driving maneuver involves uncomfortable (albeit safe) proximity to obstacles on a roadway. Another comfort problem could be, for instance, that performing a driving maneuver involves uncomfortably (albeit safely) quick approach to obstacles on a roadway. Related comfort problems could be, for instance, having to abandon a driving maneuver to avoid one or more other comfort problems, or having to create another type of problem, such as a navigational problem, to avoid one or more other comfort problems.

A navigational problem could be, for instance, that performing a driving maneuver involves missing a turn or an exit along a roadway. Another navigational problem could be, for instance, that performing a driving maneuver involves getting stuck in the wrong lane of a roadway, such as in or out of a turn lane or an exit lane. Another navigational problem could be, for instance, that performing a driving maneuver involves getting stuck behind slow moving obstacles on a roadway. Related navigational problems could be, for instance, having to abandon a driving maneuver to avoid one or more other navigational problems, or having to create another type of problem, such as a comfort problem, to avoid one or more other navigational problems.

The planning/decision making module 94 determines the overall risk of performing driving maneuvers as the product of one, some or all of the problems with their performance. The planning/decision making module 94 may determine the risk, similarly to its identification of the problems, either alone or in combination with its generation of the driving plans.

The risk of performing a driving maneuver could have a single component, for example, or separate components, such as safety, comfort and navigational components. In cases where the risk of performing a driving maneuver has a single component, the component could be the aggregated product of some or all of the problems with its performance, for instance, or the product of any one dominating problem, such as a safety problem. In cases where the risk of performing a driving maneuver has safety, comfort and navigational components, the components could each be the aggregated product of some or all of the safety, comfort or navigational problems with its performance, respectively, for instance, or as the product of any one dominating safety, comfort or navigational problem, as the case may be.

The planning/decision making module 94 categorizes the performance of driving maneuvers based on the risk of their performance. For example, it may be determined that higher risks render performing some driving maneuvers impossible, unsafe or otherwise infeasible, while lower risks render performing other driving maneuvers feasible. Among driving maneuvers whose performance is infeasible, it may be determined that performing a driving maneuver is both not impossible and not unsafe, but nonetheless with too much risk, for example. Among driving maneuvers whose performance is feasible, it may be determined that performing a driving maneuvers is feasible, but with some risk, or that performing a driving maneuver is feasible, and substantially without risk, for example.

In some implementations, the planning/decision making module 94 may quantify the risk of performing driving maneuvers in support of its categorization of their performance. The quantified risk may be considered, for example, against a risk continuum with a primary risk threshold and a secondary risk threshold below the primary risk threshold.

In these implementations, on the one hand, if the risk of performing a driving maneuver is at or above the primary risk threshold, it is determined that the risk renders its performance infeasible. Optionally, the risk continuum may have auxiliary risk thresholds between the primary risk threshold and the secondary risk threshold. The auxiliary risk thresholds may be used to determine whether, among those of the driving maneuvers whose performance is infeasible, their performance is impossible, unsafe or otherwise infeasible.

On the other hand, if the risk of performing a driving maneuver is below the primary risk threshold, it is determined that its performance is feasible. If the risk is, moreover, at or above the secondary risk threshold, it is determined that performing the driving maneuver feasible, but with some risk. If, however, the risk is below the secondary risk threshold, it is determined that performing the driving maneuver is feasible, and substantially without risk.

The categorization of the performance of a driving maneuver may be implemented with respect to a single component of the risk of its performance, or with respect to separate safety, comfort and navigational components of the risk of its performance, as the case may be. In one implementation where the risk of performing a driving maneuver includes separate safety, comfort and navigational components, the risk continuum may have separate primary risk thresholds for each of the safety, comfort and navigational components. In these cases, if any safety, comfort or navigational component of the risk of performing a driving maneuver is at or above its respective primary risk threshold, it is determined that the risk of performing the driving maneuver renders its performance infeasible.

In operations 210-216, based on its categorization of the performance of driving maneuvers based on the risk of their performance, the planning/decision making module 94 determines whether to reject, accept or provisionally accept the driving maneuvers.

If performing a driving maneuver is impossible, the driving maneuver should be summarily rejected. Likewise, a driving maneuver should be rejected if performing the driving maneuver is unsafe. Accordingly, in operation 210, if the planning/decision making module 94 categorizes driving maneuvers as impossible or unsafe, it rejects those driving maneuvers in operation 212. It follows that, although certain driving maneuvers may be accepted notwithstanding some risk, performing these driving maneuvers is safe. In other words, descriptions that certain driving maneuvers may be performed notwithstanding some risk do not imply that a driving maneuver whose performance is unsafe would ever be performed.

Beyond cases where performing a driving maneuver is impossible or unsafe, performing some driving maneuvers may be otherwise infeasible and, as a result, those driving maneuvers should also be rejected. For example, a driving maneuver whose performance is both possible and safe, but with too much risk, should be rejected. Accordingly, in operation 210, if the planning/decision making module 94 categorizes driving maneuvers as otherwise infeasible, it rejects those driving maneuvers in operation 212.

On the other hand, driving maneuvers should be subject to acceptance if performing the driving maneuvers is feasible.

In cases where performing a driving maneuver is both feasible and substantially without risk, the driving maneuver could be accepted as a matter of course. Accordingly, in operation 214, if the planning/decision making module 94 categorizes driving maneuvers as feasible, and substantially without risk, it accepts those driving maneuvers in operation 216.

In cases of identification from a user request, rejections of driving maneuvers are taken as denials of the user requests for the vehicle 10 to perform those driving maneuvers, while acceptances of driving maneuvers are taken as grants of the user requests for the vehicle 10 to perform those driving maneuvers. Optionally, the vehicle 10 may inform the user of these grants and denials of the user requests. The information is output to the user at the various interfaces implemented by the components of the audio/video system 46. Accordingly, the planning/decision making module 94 may generate signals representing the information as media transformable into visual outputs at the surfaces of the displays 54 of the audio/video system 46, or as media transformable by the speakers 52 of the audio/video system 46 into sound outputs, or both.

In cases where performing a driving maneuver is feasible, but with some risk, the driving maneuver should be treated as acceptable, but subject to the user being apprised of the risk and, notwithstanding the risk, confirming the driving maneuver as a condition to its acceptance. Accordingly, in operation 214, if the planning/decision making module 94 categorizes driving maneuvers as feasible, but with some risk, it provisionally accepts those driving maneuvers subject to the remainder of the process 200. In cases of identification from a user request, provisional acceptances of driving maneuvers are taken as provisional grants of the user requests for the vehicle 10 to perform the driving maneuvers.

In operation 218, for driving maneuvers categorized as feasible, but with some risk, the planning/decision making module 94 visually simulates the driving plans for performing those driving maneuvers. Visually simulating the driving plans for performing the driving maneuvers conveys, by allowing the user to visualize, the problems with their performance. This, in turn, apprises the user of the risk determined based on those problems.

Although operation 218 is described with reference to driving maneuvers categorized as feasible, but with some risk, the planning/decision making module 94 could also visually simulate the driving plans for performing otherwise categorized driving maneuvers. In cases of identification from a user request, for example, the driving plan for performing an accepted driving maneuver could be visually simulated as part of the vehicle 10 informing the user of the corresponding grant of the user request for the vehicle 10 to perform that driving maneuver. Similarly, the driving plan for performing a rejected driving maneuver could be visually simulated as part of the vehicle 10 informing the user of the corresponding denial of the user request for the vehicle 10 to perform that driving maneuver.

To support the visual simulation of driving plans, the planning/decision making module 94 generates signals representing the performance of their driving maneuvers as media. This media is transformable into visual outputs at the surfaces of the displays 54 of the audio/video system 46.

Some problems with performing driving maneuvers, as well as the risk determined based on those problems, are reflected in the driving plans themselves. For example, certain comfort problems, such as when performing a driving maneuver involves uncomfortable actions, such as uncomfortably aggressive acceleration, braking or steering, or combinations of these, for instance, are reflected in driving plans.

Accordingly, visually simulating driving plans may include displaying a temporal series, or sequence, of the actions associated with performing their driving maneuvers. The displayed actions associated with performing a driving maneuver may include at least one of, at least two of, at least three of or all of acceleration, braking, steering and signaling associated with performing the driving maneuver, for example.

Other problems with performing driving maneuvers, as well as the risk determined based on those problems, are further reflected in information about the environment surrounding the vehicle 10. For example, certain comfort problems, such as when performing a driving maneuver involves uncomfortable proximity to obstacles on a roadway, or involves uncomfortably quick approach to obstacles on a roadway, for instance, are further reflected in information about the environment surrounding the vehicle 10. Also, for example, certain navigational problems, such as when performing a driving maneuver involves missing a turn or an exit along a roadway, involves getting stuck in the wrong lane of a roadway or involves getting stuck behind slow moving obstacles on a roadway, for instance, are further reflected in information about the environment surrounding the vehicle 10.

Accordingly, visually simulating driving plans may also include displaying a sequence of relationships between the actions associated with performing their driving maneuvers, on the one hand, and the environment surrounding the vehicle 10, including objects in the environment surrounding the vehicle 10, as well as traffic rules, on the other hand. In cases where an object in the environment surrounding the vehicle 10 is a roadway, the roadway and, where applicable, its multiple different lane positions, may be displayed, for example. In other words, the visual simulation of driving plans may be done at the lane-level of roadways. In cases where an object in the environment surrounding the vehicle 10 is an obstacle on the roadway, the predicted future maneuvering of the obstacles along the roadway may be displayed, for example. In many cases, the obstacles will be moving on roadways, and the predicted future maneuvering of the obstacles will, accordingly, include motion. In these cases, the visual simulation of driving plans allows the user to visualize the evolution in time of the relative movement between the vehicle 10 and the objects.

Optionally, the visual simulation of driving plans may be augmented by descriptions or other cues of the problems with performing their driving maneuvers to further apprise the user of the risk determined based on those problems. The visual simulation of driving plans may moreover be augmented by descriptions or other cues of the actions associated with performing their driving maneuvers. These descriptions or other cues may be output to the user at the various interfaces implemented by the components of the audio/video system 46. Accordingly, the planning/decision making module 94 may generate signals representing these descriptions or other cues as media transformable into visual outputs at the surfaces of the displays 54 of the audio/video system 46, or as media transformable by the speakers 52 of the audio/video system 46 into sound outputs, or both.

The descriptions or other cues employed to augment the visual simulation of driving plans may be output for one, some or all of the problems with performing their driving maneuvers, as well as for one, some or all of the actions associated with performing their driving maneuvers. In some implementations, these descriptions or other cues may be selectively output for a given driving plan to alert the user of certain problems with performing its driving maneuver or certain actions associated with performing its driving maneuver, or both. These descriptions or other cues may, for instance, be output for a given driving plan when certain actions among a larger sequence of actions associated with performing its driving maneuver are the basis of problems with performing the driving maneuver that are determined as substantial or otherwise non-trivial to the user.

Upon the user being appraised, via the visual simulations of the driving plans, of the risk of performing their driving maneuvers, in operation 220, the planning/decision making module 94 queries the user for confirmation of the driving maneuvers.

Beyond questions of whether the user confirms the driving maneuvers, the queries may include parts of a larger discourse about the risk of their performance. For example, the queries may include, before or contemporaneously with the visual simulations of the driving plans, introductory descriptions of the predicate determinations that the overall risk of performing their driving maneuvers renders performing the driving maneuvers feasible, but with some risk, as well as descriptions that, because of the risk of their performance, the driving maneuvers are, although acceptable, only provisionally accepted. In cases of identification of the driving maneuvers by the vehicle 10, the queries may further include descriptions that offers are being made by the vehicle 10, to the user, to perform the driving maneuvers. In cases of identification of the driving maneuvers from user requests, the queries may further include descriptions that the user requests for the vehicle 10 to perform the driving maneuvers are only provisionally granted. The queries may then follow up on these descriptions with the questions of whether the user confirms the driving maneuvers notwithstanding the risk of their performance.

The queries are output to the user at the various interfaces implemented by the components of the audio/video system 46. Accordingly, the planning/decision making module 94 may generate signals representing the queries as media transformable into visual outputs at the surfaces of the displays 54 of the audio/video system 46, or as media transformable by the speakers 52 of the audio/video system 46 into sound outputs, or both.

Upon posing the questions of whether the user confirms the driving maneuvers, the vehicle 10 waits for user responses to the queries. The user responses to the queries for confirmation of the driving maneuvers are identified from inputs received from the user at the various interfaces implemented by the components of the audio/video system 46. The planning/decision making module 94 may, for instance, identify the user responses to queries for confirmation of the driving maneuvers from input signals transformed from corresponding verbal inputs detected by the microphones 50. Similarly, the planning/decision making module 94 may, for instance, identify the user responses to queries for confirmation of the driving maneuvers from input signals transformed from corresponding mechanical inputs detected by touch screens in the displays 54.

If the user is not comfortable with a driving maneuver because of the risk of its performance, or otherwise, the user response to a query for confirmation of the driving maneuver could be that the user does not confirm the driving maneuver. In cases of identification from a user request, the user not confirming a driving maneuver is taken as a user withdrawal of the user request for the vehicle 10 to perform that driving maneuver. If a user response to a query for confirmation of a driving maneuver is that the user does not confirm the driving maneuver, the driving maneuver is rejected by the planning/decision making module 94 in operation 212.

However, if a user is comfortable with a driving maneuver notwithstanding the risk of its performance, their user response to a query for confirmation of the driving maneuver could be that the user confirms the driving maneuver. In cases of identification from a user request, the user confirming a driving maneuver is taken as a user confirmation of the user request for the vehicle 10 to perform that driving maneuver. If a user response to a query for confirmation of a driving maneuver is that the user does not confirm the driving maneuver, the driving maneuver is accepted by the planning/decision making module 94 in operation 216.

Upon the planning/decision making module 94 accepting driving maneuvers in operation 216, in operation 224, the control module 96 operates the appropriate vehicle systems 30 to execute the driving plans for performing those driving maneuvers. With the execution of the driving plans, the vehicle 10 is maneuvered according to the driving plans to perform the driving maneuvers.

Figure 3:
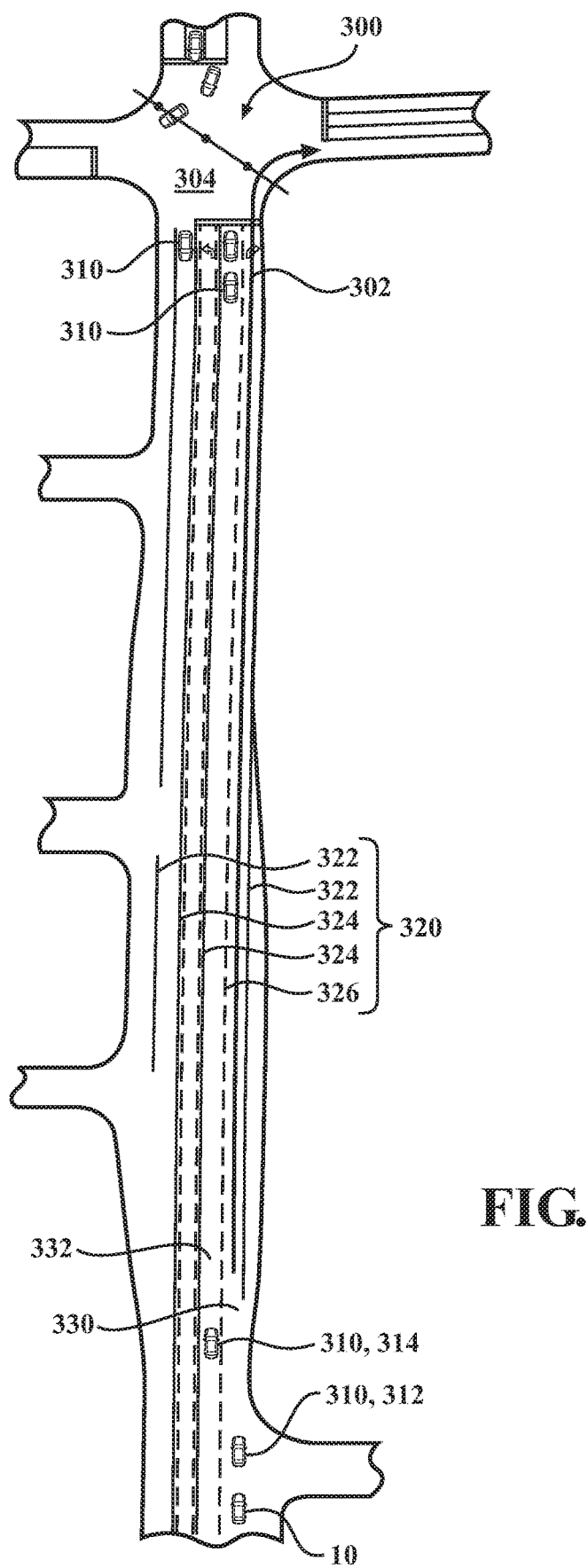
FIGS. 3 and 4 are overhead views of vehicles and example environments surrounding the vehicles.
Figure 4:
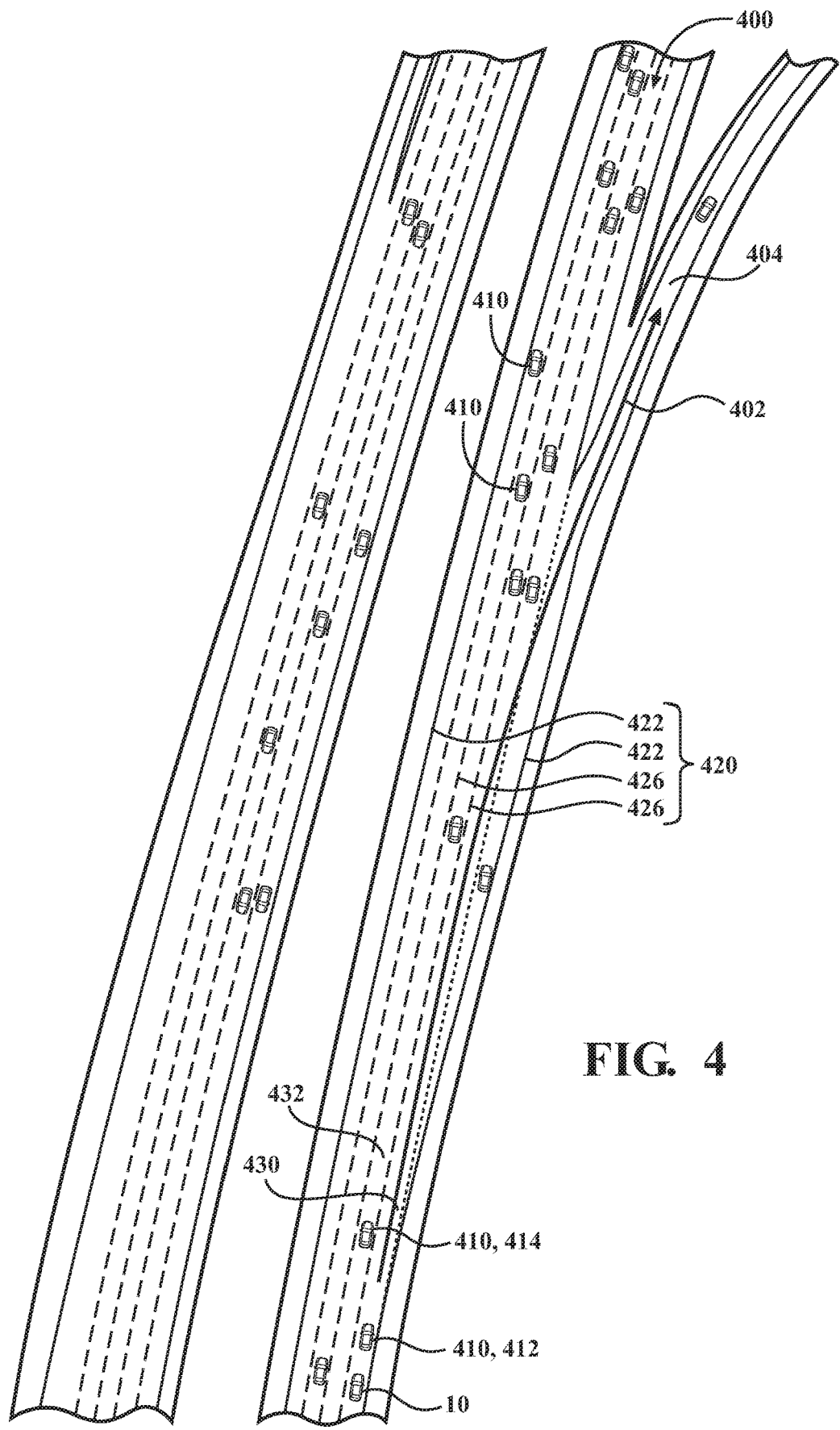

In FIGS. 3 and 4, the vehicle 10 is shown as an example of a host vehicle (i.e., a vehicle equipped with the autonomous operation system 20), along with different environments surrounding the vehicle 10.

In FIG. 3, the vehicle 10 is shown on a surface-type roadway 300. The vehicle 10 is maneuvering along the roadway 300 according to a route 302 for the vehicle 10 established by the navigation system 44. The route 302 dictates, among other things, the vehicle 10 turning off the roadway 300 at an upcoming intersection 304.

As the perception module 92 gathers and evaluates information about the vehicle 10 and the environment surrounding the vehicle 10, it may identify, among other objects in the environment surrounding the vehicle 10, the roadway 300 and obstacles on the roadway 300, such as other vehicles 310, including a vehicle 312 leading the vehicle 10, and a vehicle 314 flanking the vehicle 10. The perception module 92 may further identify the properties of these and other objects, including their presence, location and motion. For example, among other identifiable properties, the currently leading vehicle 312 and the currently flanking vehicle 314 are moving in the same direction as the vehicle 10 along the roadway 300. The currently leading vehicle 312 and the currently flanking vehicle 314 are both ahead of the vehicle 10, with the currently flanking vehicle 314 ahead of the currently leading vehicle 312. The vehicle 10 may be following the currently leading vehicle 312 at approximately the same speed, while gaining, along with the currently leading vehicle 312, on the currently flanking vehicle 314.

The roadway 300 has, among other identifiable features, lane markings 320. The lane markings 320 include edge lines 322 marking the outside boundaries of the roadway 300. The lane markings further include center lines 324 marking the separation of the roadway 300 into a middle section for turning and surrounding sections for traffic moving in opposite directions, as well as center lines 326 marking multiple different lane positions for traffic moving in each direction. For the traffic moving in the same direction as the vehicle 10, the currently leading vehicle 312 and the currently flanking vehicle 314 along the roadway 300, the different lane positions include a right-hand lane position 330 in which the vehicle 10 and the currently leading vehicle 312 are located, and a left-hand lane position 332 in which the currently flanking vehicle 314 is located. Among identifiable traffic rules, the right-hand lane position 330 becomes a turn lane ahead of the vehicle 10. The route 302 dictates the vehicle 10 turning off the roadway 300 at the upcoming intersection 304 from the right-hand lane position 330.

In FIG. 4, the vehicle 10 is shown on a highway-type roadway 400. The vehicle 10 is maneuvering along the roadway 400 according to a route 402 for the vehicle 10 established by the navigation system 44. The route 402 dictates, among other things, the vehicle 10 exiting the roadway 400 at an upcoming exit 404.

As the perception module 92 gathers and evaluates information about the vehicle 10 and the environment surrounding the vehicle 10, it may identify, among other objects in the environment surrounding the vehicle 10, the roadway 400 and obstacles on the roadway 400, such as other vehicles 410, including a vehicle 412 leading the vehicle 10, and a vehicle 414 flanking the vehicle 10. The perception module 92 may further identify the properties of these and other objects, including their presence, location and motion. For example, among other identifiable properties, the currently leading vehicle 412 and the currently flanking vehicle 414 are moving in the same direction as the vehicle 10 along the roadway 400. The currently leading vehicle 412 and the currently flanking vehicle 414 are both ahead of the vehicle 10, with the currently flanking vehicle 414 ahead of the currently leading vehicle 412. The vehicle 10 may be following the currently leading vehicle 412 at approximately the same speed, while gaining, along with the currently leading vehicle 412, on the currently flanking vehicle 414.

The roadway 400 has, among other identifiable features, lane markings 420. The lane markings 420 include edge lines 422 marking the outside boundaries of the roadway 400. The lane markings further include center lines 426 marking multiple different lane positions, including a right-hand lane position 430 in which the vehicle 10 and the currently leading vehicle 412 are located, and a left-hand lane position 432 in which the currently flanking vehicle 414 is located. Among identifiable traffic rules, the right-hand lane position 430 becomes an exit lane ahead of the vehicle 10. The route 402 dictates the vehicle 10 exiting the roadway 400 at the upcoming exit 404 from the right-hand lane position 430.

In the environments surrounding the vehicle 10 in FIGS. 3 and 4, a takeover is one example of an identifiable candidate driving maneuver. Specifically, for the environment surrounding the vehicle 10 in FIG. 3, a takeover of the currently leading vehicle 312 could be identified as a candidate driving maneuver. Similarly, for the environment surrounding the vehicle 10 in FIG. 4, a takeover of the currently leading vehicle 412 could be identified as a candidate driving maneuver.

Figure 5:
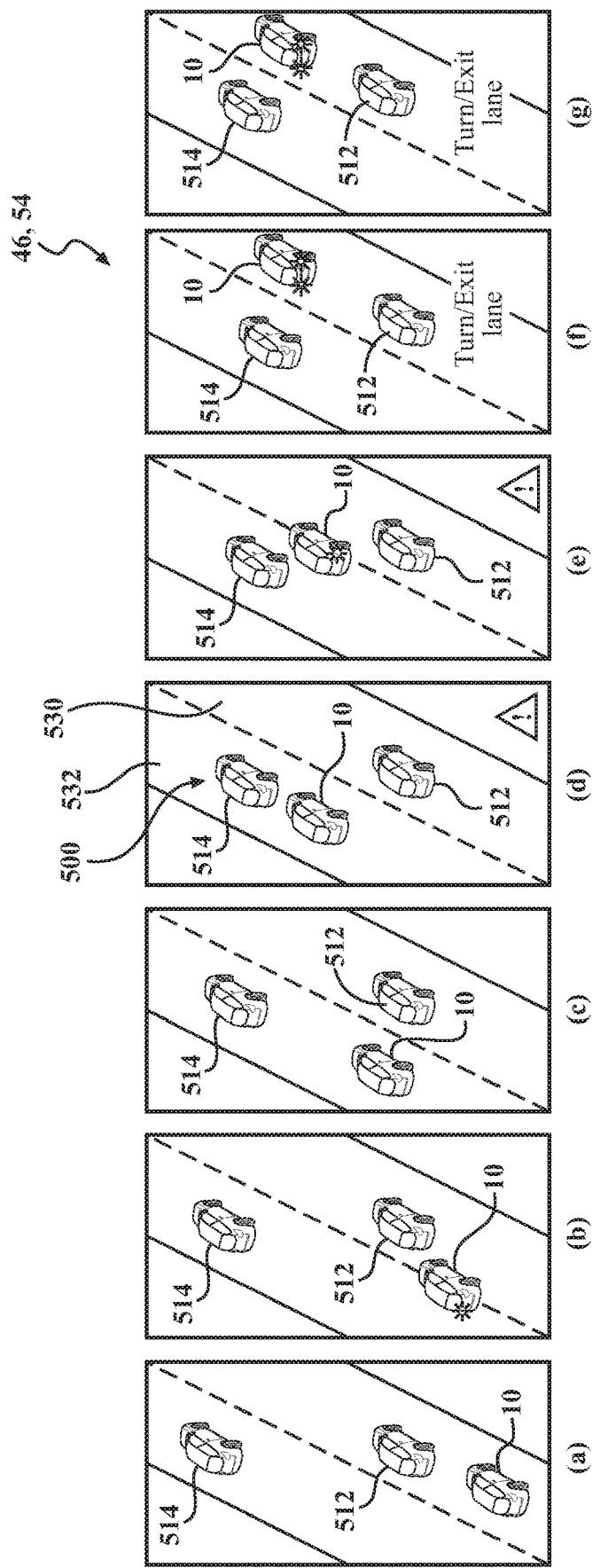
FIG. 5 is a conceptual rendering of a visual simulation of a driving plan for performing an example vehicle maneuver.

With the generation of a driving plan for performing the takeover, the identification of the problems with performing the takeover, the determination of the risk of performing the takeover, the categorization of the performance of the takeover as feasible, but with some risk and the resulting provisional acceptance of the takeover, for example, the driving plan for performing the takeover may be visually simulated. An example visual simulation of a driving plan for performing a takeover is represented in FIG. 5 as a conceptual rendering of visual outputs at the surfaces of the displays 54 of the audio/video system 46 at a sequence of times (a)-(g). Since performing the takeover includes the performance of other driving maneuvers, such as slowing down, speeding up and lane changes, and combinations of these, it will be understood that the represented example visual simulation for performing the takeover is applicable in principle to visual simulations of driving plans for performing the included or any other driving maneuvers.

At time (a), the vehicle 10 is maneuvering along a roadway 500. The roadway 500 has a right-hand lane position 530 in which the vehicle 10 and a currently leading vehicle 512 are located, and a left-hand lane position 532 in which a currently flanking vehicle 514 is located. The currently leading vehicle 512 and the currently flanking vehicle 514 are moving in the same direction as the vehicle 10 along the roadway 500. The currently leading vehicle 512 and the currently flanking vehicle 514 are both ahead of the vehicle 10, with the currently flanking vehicle 514 ahead of the currently leading vehicle 512. The currently leading vehicle 512 is, moreover, riding the edge of right-hand lane position 530. The vehicle 10 may be following the currently leading vehicle 512 at approximately the same speed, while gaining, along with the currently leading vehicle 512, on the currently flanking vehicle 514, as shown across the times (a)-(g).

From time (a) to time (b), the combined actions of acceleration, left-hand steering and left-turn signaling are associated with performing the takeover as the vehicle 10 speeds up and starts to change from the right-hand lane position 530 to the left-hand lane position 532. With these actions displayed among the larger sequence of displayed actions associated with performing the takeover, the user could visualize the comfort problem with performing the takeover that, for example, performing the takeover involves an uncomfortably aggressive combination of acceleration and steering. With the further display of the relationship between the displayed actions of acceleration, steering and signaling, on the one hand, and the predicted future maneuvering of the currently leading vehicle 512 along the roadway 500, on the other hand, the user could visualize the comfort problem with performing the takeover that, for example, performing the takeover involves uncomfortable proximity to the leading vehicle 512.

From time (b) to time (c), the continued combined actions of acceleration and left-hand steering are associated with performing the takeover as the vehicle 10 finishes changing from the right-hand lane position 530 to the left-hand lane position 532, and continues to speed up. Once again, with these actions displayed among the larger sequence of displayed actions associated with performing the takeover, the user could visualize the comfort problem with performing the takeover that, for example, performing the takeover involves an uncomfortably aggressive combination of acceleration and steering. With the further display of the relationship between the displayed actions of acceleration and steering, on the one hand, and the right-hand lane position 530 in which the now flanking vehicle 512 is located, the left-hand lane position 532 in which the vehicle 10 is now located and the predicted future maneuvering of the currently flanking vehicle 512 along the roadway 500, on the other hand, the user could visualize the comfort problem with performing the takeover that, for example, performing the takeover involves uncomfortable proximity to the currently flanking vehicle 512 as a result of it riding the edge of right-hand lane position 530.

From time (c) to time (d), the continued action of acceleration is associated with performing the takeover as the vehicle 10 continues to speed up and move past the currently flanking vehicle 512 in the left-hand lane position 532. With the action of acceleration displayed among the larger sequence of displayed actions associated with performing the takeover, the user could visualize the comfort problem with performing the takeover that, for example, performing the takeover involves uncomfortably aggressive acceleration. With the further display of the relationship between the displayed action of acceleration, on the one hand, and the predicted future maneuvering of the currently flanking vehicle 512 and the now leading vehicle 514 along the roadway 500, on the other hand, the user could visualize the comfort problem with performing the takeover that, for example, performing the takeover involves uncomfortably quick approach to the currently leading vehicle 514 as a result of the currently flanking vehicle 512 continuing to gain on the currently leading vehicle 514.

From time (d) to time (e), the combined actions of right-hand steering and right-turn signaling are associated with performing the takeover as the vehicle 10 changes back from the left-hand lane position 532 to the right-hand lane position 530. With these actions displayed among the larger sequence of displayed actions associated with performing the takeover, the user could visualize the comfort problem with performing the takeover that, for example, performing the takeover involves uncomfortably aggressive steering. With the further display of the relationship between the displayed actions of steering and signaling, on the one hand, and the predicted future maneuvering of the now following vehicle 512 and the now flanking vehicle 514 along the roadway 500, on the other hand, the user could visualize the comfort problem with performing the takeover that, for example, performing the takeover involves uncomfortable proximity to both the currently following vehicle 512 and the currently flanking vehicle 514 as a result of the currently following vehicle 512 continuing to gain on the currently flanking vehicle 514.

It may be the case that the problems with performing the takeover at times (d) and time (e), on which the displayed actions of acceleration and steering are based, are substantial or otherwise non-trivial to the user. Accordingly, the visual simulation of the driving plan for performing the takeover may be augmented by descriptions or other cues of the problems, by descriptions or other cues of the actions, or both. For instance, with respect to the comfort problem with performing the takeover that performing the takeover involves uncomfortably quick approach to the currently leading vehicle 514 from time (d) to time (e), "Close Approach" or another description of the comfort problem could be output at the speakers 52 or the display 54 of the audio/video system 46. With respect to the displayed actions of acceleration and steering at times (d) and (e), a visual output in the form of a warning sign could be output at the display 54, as generally shown, for example. Other cues, such as a visual output in the form of highlighting via changing a background color of the display 54 (e.g., to red), for example, could also be employed.

From time (e) to time (f), the combined actions of braking and brake signaling are associated with performing the takeover as the vehicle 10 slows down to approach where the right-hand lane position 530 becomes a turn or an exit lane ahead of the vehicle 10. With the action of braking displayed among the larger sequence of displayed actions associated with performing the takeover, the user could visualize the comfort problem with performing the takeover that, for example, performing the takeover involves uncomfortably aggressive braking. With the further display of the relationship between the displayed action of braking, on the one hand, and the predicted future maneuvering of the currently following vehicle 512 along the roadway 500, on the other hand, the user could visualize the comfort problem with performing the takeover that, for example, performing the takeover involves uncomfortably quick approach to the currently following vehicle 512.

From time (f) to time (g), the continued combined actions of braking and brake signaling are associated with performing the takeover as the vehicle 10 continues to slow down and approaches where the right-hand lane position 530 becomes a turn or an exit lane. Once again, with the action of braking displayed among the larger sequence of displayed actions associated with performing the takeover, the user could visualize the comfort problem with performing the takeover that, for example, performing the takeover involves uncomfortably aggressive braking. With the further display of the relationship between the displayed action of braking, on the one hand, and the predicted future maneuvering of the currently following vehicle 512 along the roadway 500 and the traffic rule that the right-hand lane position 530 becomes a turn or an exit lane ahead of the vehicle 10, on the other hand, the user could visualize the comfort problem with performing the takeover that performing the takeover involves uncomfortably quick approach to the currently following vehicle 512. Additionally, the user could visualize the navigational problem with performing the takeover that, for example, performing the takeover involves missing a turn or an exit from the right-hand lane position 530 ahead of the vehicle 10. Otherwise, the user could visualize the related navigational problem with performing the takeover that, for example, avoiding missing the turn or the exit from the right-hand lane position 530 ahead of the vehicle 10 creates the comfort problems that performing the takeover involves uncomfortably aggressive braking and uncomfortably quick approach to the currently following vehicle 512.

The example visual simulation of a driving plan for performing a takeover involves the vehicle 512 and the vehicle 514, as well as the vehicle 10, moving on the roadway 500 temporally well beyond what the user might otherwise be able to understand or predict at the outset of the takeover. Since, however, the visual simulation of the driving plan allows the user to visualize the evolution in time of the relative movement between the vehicle 10, the vehicle 512 and the vehicle 514, the user can easily visualize the problems with performing the takeover and, in turn, be apprised of the risk determined based on those problems.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of autonomous driving, comprising:
 evaluating, using a perception module executable by at least one processor, information about an environment surrounding a vehicle;
 using a planning/decision making module executable by the at least one processor:

identify a driving maneuver from a user request for the vehicle to perform the driving maneuver received at at least one interface;

generate a driving plan for performing the driving maneuver based on the evaluation of the information about the environment surrounding the vehicle;

conditionally upon categorizing the driving maneuver as feasible, but with some risk, to apprise a user of the risk of performing the driving maneuver, visually simulate the driving plan by displaying, on a display, a sequence of actions associated with performing the driving maneuver, thereby conveying at least one problem with performing the driving maneuver with which the risk of performing the driving maneuver is associated; and output, at the at least one interface, a query whether the user confirms the driving maneuver; and operating, using a control module executable by the at least one processor, vehicle systems in the vehicle to perform the driving maneuver according to the driving plan conditionally upon receiving a user response to the query, at the at least one interface, that the user confirms the driving maneuver.

2. The method of claim 1, wherein visually simulating the driving plan includes displaying, on the display, a sequence of relationships between the displayed actions associated with performing the driving maneuver and the environment surrounding the vehicle.

3. The method of claim 1, wherein visually simulating the driving plan includes displaying, on the display, a sequence of relationships between the displayed actions associated with performing the driving maneuver, multiple lane positions of a roadway along which the vehicle is maneuvering, and a predicted future maneuvering of at least one obstacle along the roadway.

4. The method of claim 1, wherein the displayed actions associated with performing the driving maneuver include at least one of acceleration, braking, steering and signaling associated with performing the driving maneuver.

5. The method of claim 1, further comprising:
using the planning/decision making module executable by the at least one processor:
determine the risk of performing the driving maneuver; and
categorize the driving maneuver based on the risk of its performance.

6. The method of claim 1, further comprising:
using the planning/decision making module executable by the at least one processor:
identify the at least one problem with performing the driving maneuver, the at least one problem with performing the driving maneuver including at least one of a comfort problem and a navigational problem; and
determine the risk of performing the driving maneuver based on the at least one problem with performing the driving maneuver; wherein
the conveyed at least one problem with performing the driving maneuver includes the at least one of a comfort problem and a navigational problem.

7. A vehicle, comprising:
sensors configured to detect information about an environment surrounding the vehicle;
a display;
at least one interface;
vehicle systems operable to maneuver the vehicle; and one or more modules stored on memory and executable by at least one processor for initiating instructions, the instructions including:
evaluating information about the environment surrounding the vehicle detected by the sensors;
identifying a driving maneuver from a user request for the vehicle to perform the driving maneuver received at the at least one interface;
generating a driving plan for performing the driving maneuver based on the evaluation of the information about the environment surrounding the vehicle;
conditionally upon categorizing the driving maneuver as feasible, but with some risk, to apprise a user of the risk of performing the driving maneuver, visually simulating the driving plan by displaying, on the display, a sequence of actions associated with performing the driving maneuver, thereby conveying at least one problem with performing the driving maneuver with which the risk of performing the driving maneuver is associated;
outputting, at the at least one interface, a query whether the user confirms the driving maneuver; and
operating the vehicle systems to perform the driving maneuver according to the driving plan conditionally upon receiving a user response to the query, at the at least one interface, that the user confirms the driving maneuver.

8. The vehicle of claim 7, wherein visually simulating the driving plan includes displaying, on the display, a sequence of relationships between the displayed actions associated with performing the driving maneuver and the environment surrounding the vehicle.

9. The vehicle of claim 7, wherein visually simulating the driving plan includes displaying, on the display, a sequence of relationships between the displayed actions associated with performing the driving maneuver, multiple lane positions of a roadway along which the vehicle is maneuvering, and a predicted future maneuvering of at least one obstacle along the roadway.

10. The vehicle of claim 7, wherein the displayed actions associated with performing the driving maneuver include at least one of acceleration, braking, steering and signaling associated with performing the driving maneuver.

11. The vehicle of claim 7, wherein the instructions further include:
determining the risk of performing the driving maneuver; and
categorizing the driving maneuver based on the risk of its performance.

12. The vehicle of claim 7, wherein the instructions further include:
identifying the at least one problem with performing the driving maneuver, the at least one problem with performing the driving maneuver including at least one of a comfort problem and a navigational problem; and
determining the risk of performing the driving maneuver based on the at least one problem with performing the driving maneuver; wherein
the conveyed at least one problem with performing the driving maneuver includes the at least one of a comfort problem and a navigational problem.

13. A vehicle, comprising:
sensors configured to detect information about an environment surrounding the vehicle;
a display;
at least one interface;
vehicle systems operable to maneuver the vehicle; and one or more modules stored on memory and executable by at least one processor for initiating instructions, the instructions including:

evaluating information about the environment surrounding the vehicle detected by the sensors;

identifying a driving maneuver from a user request for the vehicle to perform the driving maneuver received at the at least one interface;

generating a driving plan for performing the driving maneuver based on the evaluation of the information about the environment surrounding the vehicle;

categorizing the driving maneuver, based on a risk of its performance, as infeasible, or as feasible, but with some risk;

when the driving maneuver is categorized as infeasible, rejecting the driving maneuver;

when the driving maneuver is categorized as feasible, but with some risk, provisionally accepting the driving maneuver;

conditionally upon provisionally accepting the driving maneuver, to apprise a user of the risk of performing the driving maneuver, visually simulating the driving plan by displaying, on the display, a sequence of actions associated with performing the driving maneuver, thereby conveying at least one problem with performing the driving maneuver with which the risk of performing the driving maneuver is associated;

outputting, at the at least one interface, a query whether the user confirms the driving maneuver;

non-provisionally accepting the driving maneuver conditionally upon receiving a user response to the query, at the at least one interface, that the user confirms the driving maneuver; and when the driving maneuver is non-provisionally accepted, operating the vehicle systems to perform the driving maneuver according to the driving plan.

14. The vehicle of claim 13, wherein the instructions further include:

categorizing the driving maneuver, based on a risk of its performance, as infeasible, as feasible, and substantially without risk, or as feasible, but with some risk; and when the driving maneuver is categorized as feasible, and substantially without risk, non-provisionally accepting the driving maneuver.

15. The vehicle of claim 13, wherein visually simulating the driving plan includes displaying, on the display, a sequence of relationships between the displayed actions associated with performing the driving maneuver and the environment surrounding the vehicle.

16. The vehicle of claim 13, wherein visually simulating the driving plan includes displaying, on the display, a sequence of relationships between the displayed actions associated with performing the driving maneuver, multiple lane positions of a roadway along which the vehicle is maneuvering, and a predicted future maneuvering of at least one obstacle along the roadway.

17. The vehicle of claim 13, wherein the displayed actions associated with performing the driving maneuver include at least one of acceleration, braking, steering and signaling associated with performing the driving maneuver.

18. The vehicle of claim 13, wherein the instructions further include:

identifying the at least one problem with performing the driving maneuver, the at least one problem with performing the driving maneuver including at least one of a comfort problem and a navigational problem; and determining the risk of performing the driving maneuver based on the at least one problem with performing the driving maneuver; wherein the conveyed at least one problem with performing the driving maneuver includes the at least one of a comfort problem and a navigational problem.

* * * * *